K. KUBIERSCHKY.
APPARATUS FOR SEPARATING LIQUID MIXTURES INTO TWO COMPONENTS.
APPLICATION FILED MAY 13, 1914.
1,151,801.
Patented Aug. 31, 1915.
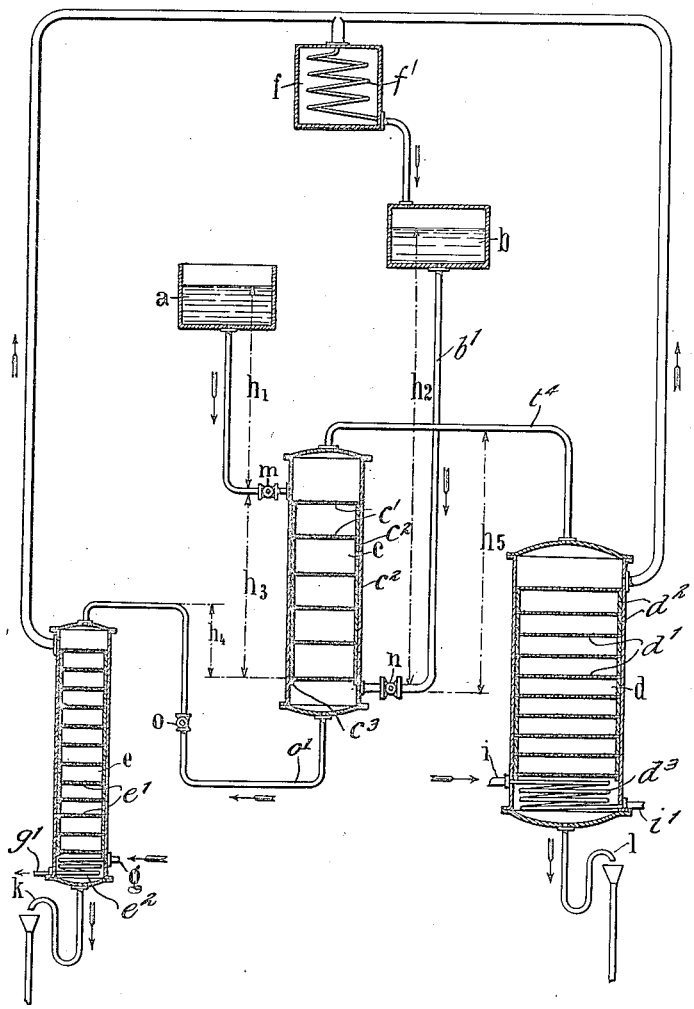

UNITED STATES PATENT OFFICE.

KONRAD KUBIERSCHKY, OF EISENACH, GERMANY.

APPARATUS FOR SEPARATING LIQUID MIXTURES INTO TWO COMPONENTS.

1,151,801.     Specification of Letters Patent.     Patented Aug. 31, 1915.

Application filed May 13, 1914. Serial No. 838,391.

*To all whom it may concern:*

Be it known that I, Dr. KONRAD KUBIER-SCHKY, chemist and engineer, residing at Eisenach, Grand Duchy of Saxe-Weimar-Eisenach, Germany, have invented certain new and useful Improvements in Apparatus for Separating Liquid Mixtures into Two Components, of which the following is a specification.

This invention relates to apparatus for separating liquid mixtures into two components in a continuous operation.

According to the invention the liquid mixture is treated with some other suitable liquid which dissolves only certain constituents of the mixture, while the other constituents remain more or less undissolved. Two solutions are thus obtained which separate owing to their different specific gravity, whereupon each is liberated by itself from the solvent. Known processes having the same purpose in view have heretofore been performed in apparatus provided with stirrers or the like, and the operation was always intermittent. The settling and drawing off of the solutions obtained was connected with considerable losses of material and solvent, and perfect separation of the two solutions was not possible.

In contradistinction thereto, according to the present invention an apparatus is used for the mentioned purpose in which the various operations take place in uninterrupted succession and in a closed system, so that the intermediate products do not leave the apparatus at all, very perfect separation of the two components is possible and losses can be practically avoided.

The invention consists in the construction, arrangement and combination of parts described hereinafter and pointed out in the claims.

One illustrative embodiment of the invention is diagrammatically represented by way of example in sectional elevation in the accompanying drawing.

Referring to the drawing, the apparatus comprises three columns $c$, $d$ and $e$ and the requisite auxiliary apparatus which are connected together by piping. The liquid mixture continuously flows out of the tank $a$ by way of the valve $m$ to the first column apparatus $c$ which is used as a washer scrubber. This column has in its interior sieve bottoms or shelves $c_1$ arranged one above the other and resting upon intermediate rings $c_2$. The lowermost of the shelves is resting upon a stationary ring $c_3$. The liquid to be separated sinks to the bottom of the washing column and is during its descent finely divided by the sieve shaped shelves and guided through the washing liquid; it leaves washed the apparatus $c$ through a pipe $o_1$ attached to the bottom thereof and provided with a valve $o$. The solvent in the tank $b$ is supplied to the washing column through a pipe $b_1$ and its flow is controlled by a valve $n$. It rises slowly, fills the entire column and dissolves the desired constituents while flowing counter to the crude liquid. The solution thus obtained flows through pipe $c_4$ continuously to the second column $d$ in which it is completely liberated from the solvent by fractional distillation and the like, so that the desired component issues pure at the outlet $l$. The column $d$ has also sieve bottoms or shelves $d_1$ resting upon the rings $d_2$ and is provided near its bottom with a heating coil $d_3$ heated by a suitable heating medium entering at $i$ and leaving at $i_1$. The remainder of the crude mixture which of course also contains a part of the solvent mechanically mixed with or dissolved in it is conducted, as mentioned above, through the valve $o$ to the third column $e$ provided in the same manner as column $d$ with sieve shelves $e$ and with a heating coil $e_2$ heated by a suitable heating medium entering at $g$ and leaving at $g_1$. The solvent is here likewise liberated by fractional distillation or the like, so that the second component leaves the apparatus in a pure state at the outlet $k$. Naturally the heating of the columns $d$ and $e$ can also be effected in any other suitable manner.

The heating medium is supplied to the columns $d$ and $e$ through the branches $i$ and $g$, respectively; either direct or indirect heating may be used. The solvent recovered in the form of vapor in the columns $d$ and $e$ passes to the condenser $f$ the heating coil $f_1$ of which is cooled in any suitable well-known manner and is supplied thence in a liquid form to the tank $b$ containing the solvent in order to be employed afresh in the scrubbing process.

The liquids may be sent through the apparatus by suitable pumps or other mechanical means. Alternatively, the height of the columns of liquid $h_1$, $h_2$, $h_3$, $h_4$, $h_5$ may be so selected having regard to the specific gravity of the various liquid mixtures and solutions that the crude, intermediate and finished products flow through and issue from the apparatus quite automatically. For example, if a solution of anilin in water is to be treated by means of benzol, the said solution will start from the tank $a$ and the benzol from the tank $b$. The scrubber $c$ will first be filled with benzol from the tank $b$ and then the solution of anilin in water will continuously flow through the valve $m$ and descend in the scrubber in the slowly rising benzol. The anilin is thereby completely dissolved by the benzol, so that only water with a small quantity of benzol passes out of the bottom of the column $c$ and through the valve $o$, and a more or less saturated solution of anilin in benzol flows out of the top of the column $c$ to the column $d$. Alternatively, the column $c$ may be kept full of the solution of anilin in water, through which the benzol will pass from below in a state of as fine distribution as possible, dissolve out the anilin and become saturated with it. The solution of anilin in benzol trickles down the column $d$ and is driven off in such manner by a suitable heating apparatus that the benzol vapors escape above to the cooler or condenser $f$ and the anilin flows away below through the outlet $l$. The solution of benzol in water in the column $e$ is driven off in like manner; the benzol vapors escape above to the cooler $f$ and the water liberated from benzol flows away below through the outlet $k$. All aqueous solutions containing a substance which is only partially soluble in water but is completely soluble in benzol, as phenol for example, can be treated in the same manner. Further, creosote-like and rosinous bodies can be washed out of brown coal tar-oils by alcohol with the same apparatus and be obtained pure together with the recovered tar-oil.

It is known when separating liquid mixtures by continuous distillation and rectification to connect several columns one with another in a closed system; in all processes known heretofore, however, the liquid mixtures were separated solely by pure distillation and recondensation, whereas according to the present invention the separation of two components is effected by the systematic combination of a scrubbing column, in which scrubbing takes place with a third liquid, with columns in which the solutions obtained are distilled and rectified.

In all the above-mentioned examples the solvent boils at a lower temperature than the components of the mixture to be separated by the scrubbing process. The employment of the described apparatus is by no means limited to the examples, but it is to be understood that the apparatus may be employed just as well for treating liquid mixtures with a solvent which boils at a higher temperature than one or both components of the crude mixture.

I claim:—

1. In apparatus for separating liquid mixtures into two components, the combination of a scrubbing column, two distilling columns connected therewith at different parts thereof, and piping connecting the distilling columns one with the other and with the scrubbing column in a closed system.

2. In apparatus for separating liquid mixtures into two components, the combination of a scrubbing column, a tank for the liquid mixture connected to the upper part thereof, a tank for a solvent connected to the lower part of the column, a condenser opening into the latter tank, two distilling columns, and piping connecting the distilling columns to the condenser, one of the distilling columns being connected to the upper end and the other to the lower end of the scrubbing column.

In testimony whereof I have hereunto set my hand in presence of two subscribing witnesses.

Dr. KONRAD KUBIERSCHKY.

Witnesses:
MARTHA SCHRADER,
ALFRED HOFFMANN.